(12) United States Patent
Saeki

(10) Patent No.: US 9,963,031 B2
(45) Date of Patent: May 8, 2018

(54) VEHICLE LOWER PORTION STRUCTURE FOR A HYBRID VEHICLE

(71) Applicant: TOYOTA JIDOSHA KABUSHIKI KAISHA, Toyota-shi, Aichi-ken (JP)

(72) Inventor: Koji Saeki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/263,995

(22) Filed: Sep. 13, 2016

(65) Prior Publication Data

US 2017/0166048 A1 Jun. 15, 2017

(30) Foreign Application Priority Data

Dec. 10, 2015 (JP) ................................. 2015-241113

(51) Int. Cl.
| | | |
|---|---|---|
| *B60K 15/063* | (2006.01) | |
| *B60K 1/04* | (2006.01) | |
| *B60K 6/28* | (2007.10) | |
| *B62D 25/20* | (2006.01) | |
| *F02M 37/00* | (2006.01) | |

(52) U.S. Cl.
CPC ............... *B60K 15/063* (2013.01); *B60K 1/04* (2013.01); *B60K 6/28* (2013.01); *B62D 25/20* (2013.01); *F02M 37/0047* (2013.01); *B60K 2001/0427* (2013.01); *B60K 2015/0634* (2013.01)

(58) Field of Classification Search
CPC ..................... B60K 15/063; B60K 2015/0634; B60K 1/04; B60K 6/28; B60K 2001/0427; B62D 25/20; F02M 37/0047

USPC ................................................ 180/69.4, 69.5
See application file for complete search history.

(56) References Cited

U.S. PATENT DOCUMENTS

| | | | | |
|---|---|---|---|---|
| 6,298,540 | B1* | 10/2001 | Benjey ................... | B60K 15/03 29/452 |
| 7,841,624 | B2* | 11/2010 | Kobayashi ....... | B60K 15/03504 180/69.4 |
| 8,616,581 | B2* | 12/2013 | Rihtar ................... | F16B 5/0657 180/69.1 |
| 8,978,617 | B2* | 3/2015 | Matsuda ................. | F02B 77/00 123/198 E |
| 9,090,160 | B2* | 7/2015 | Yoshida ............... | B62D 21/155 |
| 9,180,773 | B2* | 11/2015 | Honda .................. | B60K 11/06 |
| 9,440,530 | B2* | 9/2016 | Yoshida ................ | B60K 13/04 |

(Continued)

FOREIGN PATENT DOCUMENTS

| | | |
|---|---|---|
| JP | 2008-006904 A | 1/2008 |
| JP | 2011126439 A | 6/2011 |

(Continued)

*Primary Examiner* — John D Walters
(74) *Attorney, Agent, or Firm* — Oliff PLC

(57) ABSTRACT

A vehicle lower portion structure for a hybrid vehicle has a vehicle drive battery 32 that is mounted on top of the center floor panel 18 and on a vehicle lower side of a rear seat 26, a fuel tank 34 that is formed so as to include a tank main body portion 36 that is disposed on the vehicle lower side of the center floor panel 18 and an in-tunnel extension portion 38A that is disposed inside the floor tunnel 20 and communicates with the tank main body portion 36, and a fuel pump 40 that is provided at a position within the in-tunnel extension portion 38A where the fuel pump 40 is able to be extracted via an extraction hole 20C formed in the floor tunnel 20.

8 Claims, 4 Drawing Sheets

(56) References Cited

U.S. PATENT DOCUMENTS

2008/0000703 A1     1/2008   Shindou
2013/0160745 A1     6/2013   Kawaguchi et al.
2014/0333056 A1    11/2014   Yoshida et al.

FOREIGN PATENT DOCUMENTS

JP        2013-169876 A    9/2013
WO      2013088896 A1    6/2013

* cited by examiner

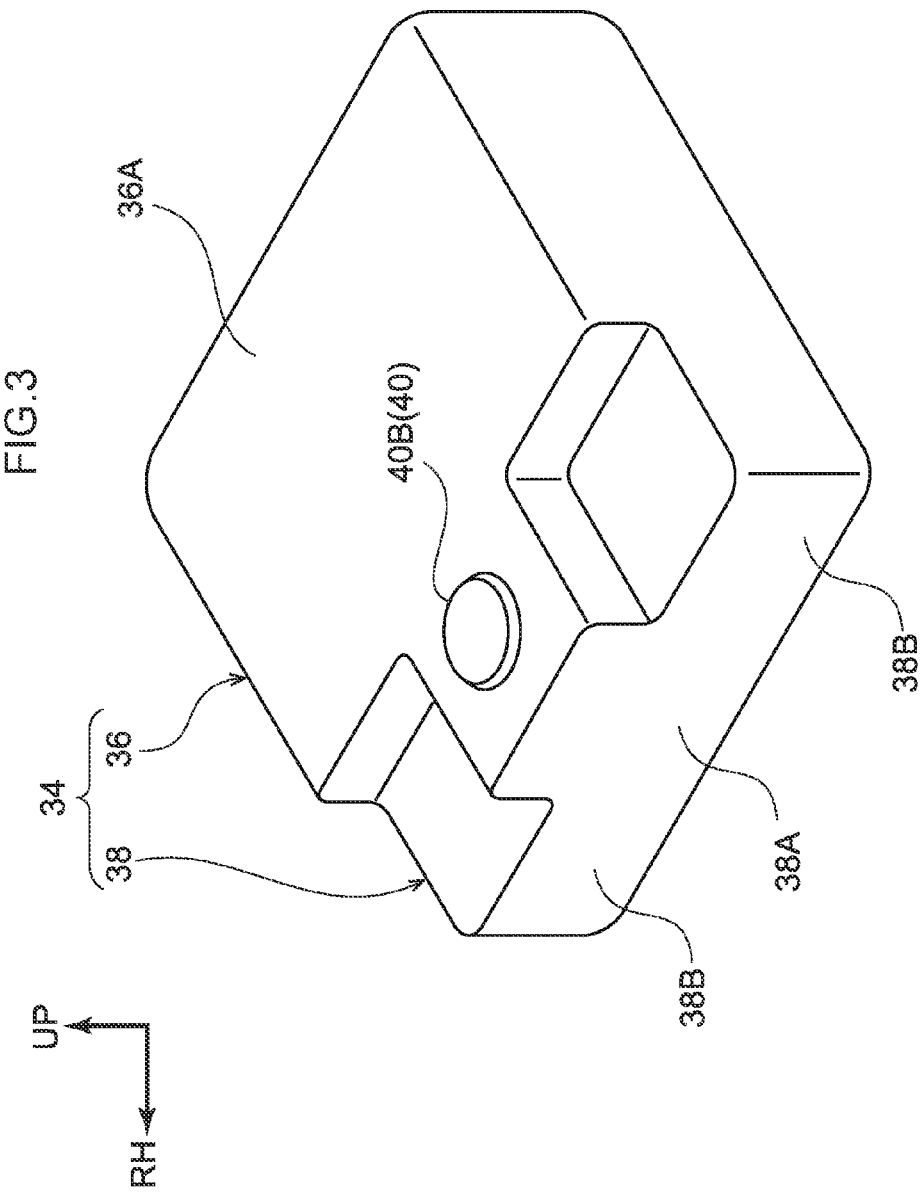

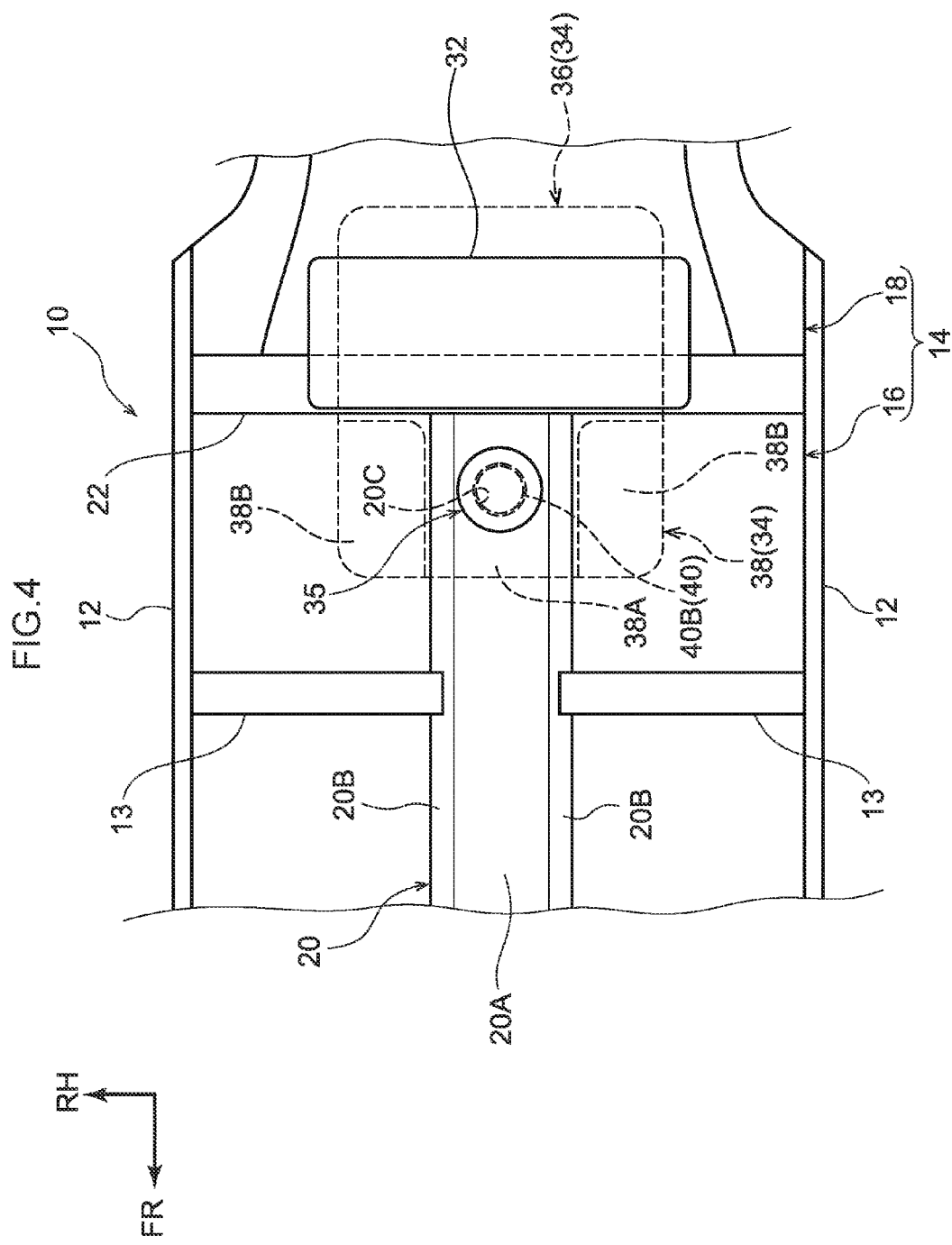

VEHICLE LOWER PORTION STRUCTURE FOR A HYBRID VEHICLE

CROSS-REFERENCE TO RELATED APPLICATION

This application is based on and claims priority under 35 USC 119 from Japanese Patent Application No. 2015-241113 filed on Dec. 10, 2015, the disclosure of which is incorporated by reference herein.

BACKGROUND

Technical Field

The present invention relates to a vehicle lower portion structure for a hybrid vehicle.

Related Art

A structure is disclosed in Japanese Patent Application Laid-Open (JP-A) No. 2008-006904 as a vehicle lower portion structure for a hybrid vehicle in which a vehicle drive battery that is used to supply power to a motor is mounted on a vehicle cabin interior side underneath the rear seat, and a fuel tank is disposed on a vehicle cabin exterior side underneath the rear seat. Moreover, in JP-A No. 2008-006904, a structure is disclosed in which, by placing a fuel pump that is provided in the fuel tank in a position where it does not overlap with the vehicle drive battery when seen in plan view, access to the fuel pump from the vehicle cabin interior becomes possible.

SUMMARY

However, as in JP-A No. 2008-006904, in a hybrid vehicle that has two drive sources, namely, an engine and a motor, because a battery (i.e., a vehicle drive battery) is also mounted, compared with a conventional vehicle in which an engine is the sole drive source, it is difficult to secure a satisfactory fuel tank capacity. Moreover, in order to access the fuel pump from the vehicle cabin interior, it is necessary to lift up the rear seat, and there remains room for improvement from the standpoint of improving the ease with which maintenance of the fuel pump can be performed.

In consideration of the above-described circumstances, it is an object of the present invention to provide a vehicle lower portion structure for a hybrid vehicle that makes maintenance easier to perform, while still securing adequate fuel tank capacity.

A vehicle lower portion structure for a hybrid vehicle according to a first aspect of the present invention has a front floor panel that is disposed at a vehicle front side of a vehicle lower portion, a floor tunnel that protrudes towards a vehicle upper side and extends in a vehicle front-rear direction being provided in the front floor panel at an intermediate portion in a vehicle transverse direction of the front floor panel, a center floor panel that is disposed at a vehicle rear side of the front floor panel so as to sandwich a step portion between the center floor panel and the front floor panel, that is also disposed at a vehicle upper side of the front floor panel, and on which a rear seat is provided, a vehicle drive battery that is disposed on top of the center floor panel and at a vehicle lower side of the rear seat, a fuel tank that is formed so as to include a tank main body portion that is disposed at a vehicle lower side of the center floor panel, at least a portion of the tank main body being disposed at a position that overlaps with the vehicle drive battery when seen in plan view, and to include an in-tunnel extension portion that is inside the floor tunnel and communicates with the tank main body portion, and a fuel pump that is provided at a position within the in-tunnel extension portion where the fuel pump is able to be extracted via an extraction hole formed in the floor tunnel.

In the vehicle lower portion structure for a hybrid vehicle according to the first aspect, a front floor panel is disposed at a vehicle front side of a step portion, and a center floor portion is disposed at a vehicle rear side so as to sandwich the step portion between the center floor panel and the front floor panel. The center floor panel is disposed at the vehicle upper side of the front floor panel, and a rear seat is provided on this center floor panel. Here, a vehicle drive battery is disposed on top of the center floor panel and at the vehicle lower side of the rear seat. A tank main body portion of a fuel tank is disposed at a vehicle lower side of the center floor panel, and at least a portion of this tank main body portion is disposed in a position where it overlaps with the drive battery when seen in plan view. An in-tunnel extension portion that communicates with the tank main body portion is disposed inside the floor tunnel. By extending the fuel tank towards the front floor panel side in this manner, it is possible to secure a sufficient fuel tank capacity even in a hybrid vehicle in which a vehicle drive battery is mounted.

A fuel pump is provided inside the in-tunnel extension portion. This fuel pump is capable of being extracted through an extraction hole that is formed in the floor tunnel. By employing this structure, when the fuel pump is being extracted from inside the vehicle cabin, the fuel pump can be accessed via the extraction hole in the floor tunnel without the rear seat having to be lifted up.

In a vehicle lower portion structure for a hybrid vehicle according to a second aspect of the present invention, an under-panel extension portion that communicates with the in-tunnel extension portion is disposed at one side in the vehicle transverse direction or on both sides in the vehicle transverse direction of the in-tunnel extension portion.

In the vehicle lower portion structure for a hybrid vehicle according to the second aspect, by locating the under-panel extension portion on one side in the vehicle transverse direction or on both sides in the vehicle transverse direction of the in-tunnel extension portion, it is possible to increase the fuel tank capacity even further.

In a vehicle lower portion structure for a hybrid vehicle according to a third aspect of the present invention, a top surface of the in-tunnel extension portion is disposed at a higher position that a general surface of the front floor panel.

In the vehicle lower portion structure for a hybrid vehicle according to the third aspect, by forming a top surface of the in-tunnel extension portion at a higher position that a general surface of the front floor panel, it is possible to increase the fuel tank capacity.

In a vehicle lower portion structure for a hybrid vehicle according to a fourth aspect of the present invention, the extraction hole is formed in a top wall of the floor tunnel, and the extraction hole overlaps with the fuel pump when seen in plan view.

In the vehicle lower portion structure for a hybrid vehicle according to the invention described in the fourth aspect, because it is possible to extract the fuel pump by pulling up the fuel pump through the extraction hole formed in the top wall of the floor tunnel, compared with a structure in which the extraction hole is formed in a side wall or the like of the floor tunnel, the fuel pump can be extracted efficiently.

As has been described above, according to the vehicle lower portion structure for a hybrid vehicle according to the first aspect, the excellent effect is achieved that maintenance is made easier to perform, while adequate fuel tank capacity is still secured.

According to the vehicle lower portion structure for a hybrid vehicle according to the second aspect, the excellent effect is achieved that it is possible to effectively increase the capacity of the fuel tank.

According to the vehicle lower portion structure for a hybrid vehicle according to the third aspect, the excellent effect is achieved that it is possible to increase the capacity of the fuel tank.

According to the vehicle lower portion structure for a hybrid vehicle according to the fourth aspect, the excellent effect is achieved that it is possible to improve work efficiency when a fuel pump is being extracted.

BRIEF DESCRIPTION OF THE DRAWINGS

Exemplary embodiments of the present disclosure will be described in detail based on the following figures, wherein:

FIG. 3 is a perspective view showing a fuel tank according to the exemplary embodiment; and FIG. 4 is a plan view showing in typical form the vehicle lower portion structure according to the exemplary embodiment.

DETAILED DESCRIPTION

Figure 1:
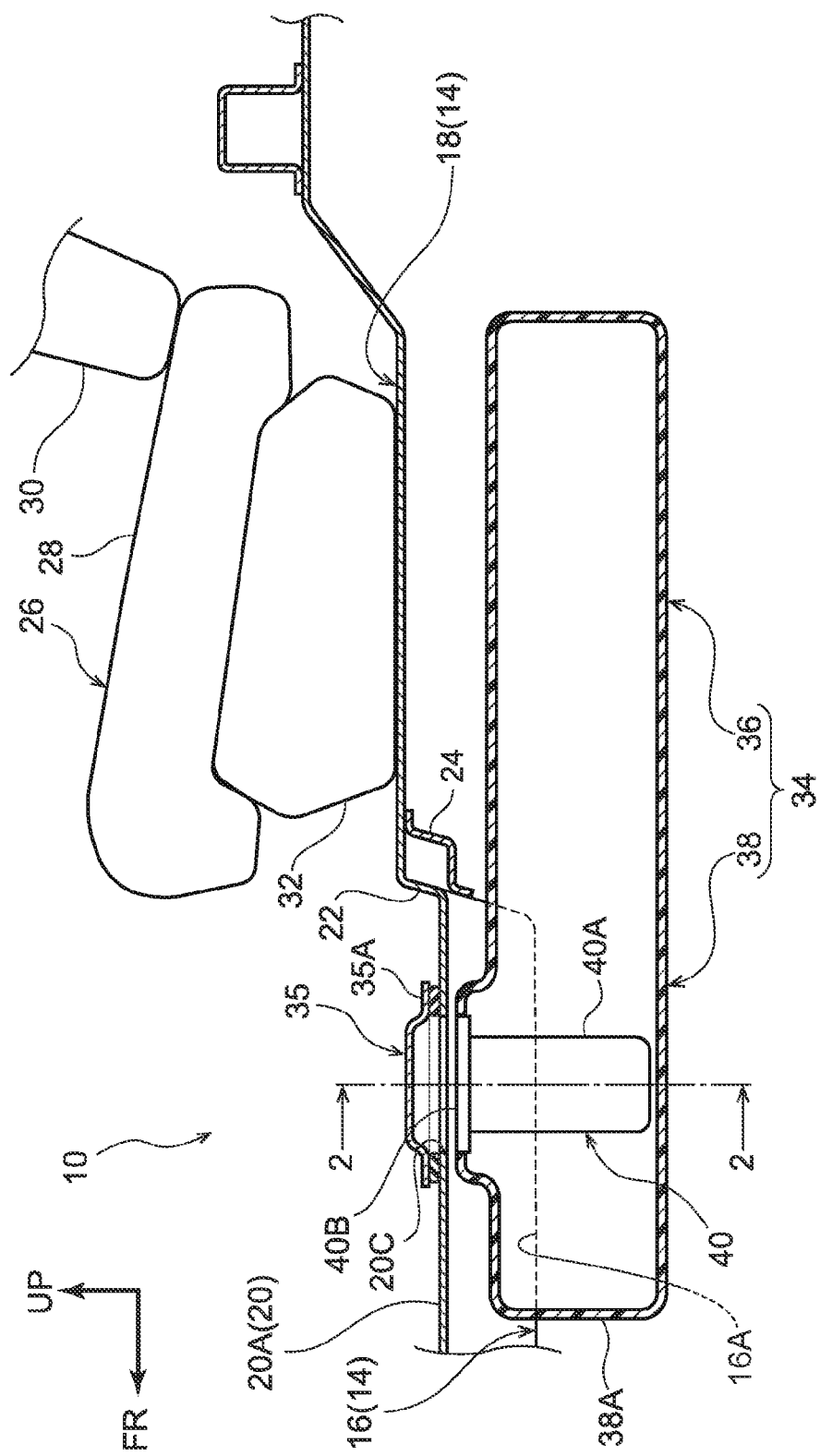
FIG. 1 is a side view showing in typical form a state when a vehicle lower portion structure according to an exemplary embodiment has been partially cut away.

Hereinafter, a vehicle lower portion structure according to an exemplary embodiment of the present invention will be described in detail based on the drawings. Note that an arrow FR, an arrow UP, and an arrow RH that are shown where appropriate in the drawings respectively indicate a vehicle front side, a vehicle upper side, and a right-hand side when the vehicle is facing in the direction of travel. Moreover, unless specifically stated otherwise, if front-rear, up-down, or left-right directions are used in the following description, then these refer respectively to the front-rear directions of the vehicle, the up-down directions of the vehicle, and the left-right directions of the vehicle when the vehicle is facing in the direction of travel.

(Structure of a Vehicle Lower Portion)

As is shown in FIG. 4, a pair of rockers 12 extend in the vehicle front-rear direction at both sides in the vehicle transverse direction of a vehicle lower portion of a hybrid vehicle 10 according to the present exemplary embodiment. A floor panel 14 that forms a floor surface of a vehicle cabin is disposed between the pair of rockers 12. Here, the floor panel 14 is formed so as to include a front floor panel 16 on the vehicle front side thereof, and a center floor panel 18 on the vehicle rear side thereof. A rear floor panel (not shown in the drawings) is disposed on the vehicle rear side of the center floor panel 18. Note that in FIG. 4, only principal portions of the vehicle lower portion structure are shown, and front and rear seats and the like have been omitted from the drawings. Moreover, the front floor panel 16 and the center floor panel 18 that form the floor panel 14 may be formed as mutually separate bodies, or as a single integral body. The same applies to the rear floor panel and, for example, it is also possible to employ a structure in which the front floor panel 16, the center floor panel 18, and the rear floor panel are formed as a single integral body from resin or the like.

The front floor panel 16 is formed in a substantially rectangular shape when seen in plan view, and both end portions in the vehicle transverse direction of the front floor panel 16 are joined respectively to one of the rockers 12. Moreover, a floor tunnel 20 is formed an intermediate portion in the vehicle transverse direction of the front floor panel 16 by causing the front floor panel 16 to protrude towards the vehicle upward side in this location.

Figure 2:
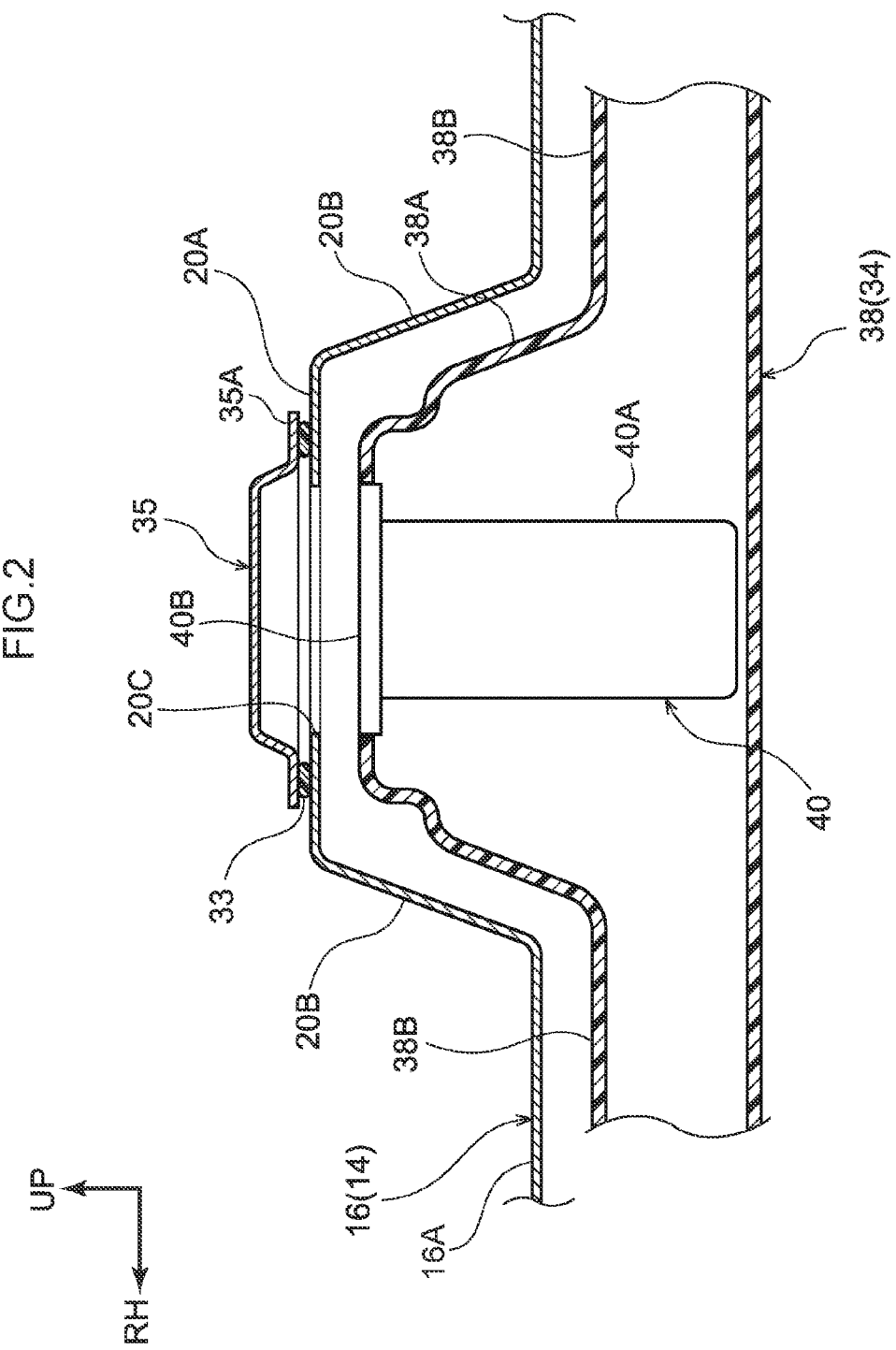
FIG. 2 is an enlarged cross-sectional view showing an enlargement of a cross-section taken along a line 2-2 in FIG. 1.

The floor tunnel 20 extends in the vehicle front-rear direction, and is formed having a U-shaped cross-section that includes a top wall 20A and a pair of side walls 20B, and that is open on the vehicle lower side (see FIG. 2). A front end portion of the floor tunnel 20 is joined to a dash panel (not shown in the drawings) in a front portion of the vehicle, while a rear end portion of the floor tunnel 20 is joined to a step portion 22 that is formed at a boundary portion between the front floor panel 16 and the center floor panel 18. Here, as is shown in FIG. 2, an extraction hole 20C is formed in the top wall 20A, and this extraction hole 20C is covered by a lid component 35.

The lid component 35 is formed in a substantially circular shape when seen in plan view. The lid component 35 is also formed having a substantially hat-shaped cross-section in which a central portion bulges towards the vehicle upward side. Circumferential edge portions of the lid component 35 are formed into a flange portion 35A, and this flange portion 35A is mounted on the top wall 20A of the floor tunnel 20 via a sealing material 33 such that the lid component 35 can be opened and closed. Specifically, a structure is employed in which the lid component 35 opens and closes by pivoting on a hinge (not shown in the drawings). Note that the present invention is not limited to this and it is also possible for the lid component 35 to be mounted on the top wall 20A by some other means such that it can be opened and closed.

As is shown in FIG. 4, cross members 13 that extend in the vehicle transverse direction between the pair of rockers 12 are provided on top of the front floor panel 16. A cross-section of the cross members 13 when viewed from the vehicle transverse direction is formed substantially in a hat-shape, and a closed cross-section is formed between each cross member 13 and the front floor panel 16. The cross members 13 are provided respectively on both sides of the floor tunnel 20. One end portion of each cross member 13 is joined to a rocker 12, while another end portion of each cross member 13 is joined to a side wall 20B of the floor tunnel 20.

The step portion 22 is formed at a rear end portion of the front floor panel 16. The step portion 22 extends in the vehicle transverse direction between the pair of rockers 12, and is formed such that a vehicle rear side thereof is higher than a vehicle front side thereof (see FIG. 1). The center floor panel 18 is disposed on the vehicle rear side of the front floor panel 16 so as to sandwich the step portion 22 between itself and the front floor panel 16.

The center floor panel 18 is disposed between the pair of rockers 12, and is disposed on the vehicle upper side of the front floor panel 16. In addition, the vehicle rear side of the center floor panel 18 has a narrower width than the vehicle front side thereof. Furthermore, as is shown in FIG. 1, the center floor panel 18 is inclined such that the height thereof becomes gradually higher as it moves towards the vehicle rearward side. A reinforcement component 24 is provided on a lower surface side of a front end portion of the center floor panel 18. The reinforcement component 24 extends in the vehicle transverse direction, and one end portion of the reinforcement component 24 is joined to the center floor panel 18, while another end portion of the reinforcement component 24 is joined to the step portion 22.

Here, a rear seat 26 is provided on top of the center floor panel 18. The rear seat 26 is constructed so as to include a seat cushion 28, a seat back 30 that is pivotably connected to a rear end portion of the seat cushion 28, and a headrest (not shown in the drawings) that is provided at a top end portion of the seat back 30.

A vehicle drive battery 32 (referred to below simply as a 'battery 32') is disposed between the seat cushion 28 of the rear seat 26 and the center floor panel 18. The battery 32 is fixed either directly or via a bracket (not shown in the drawings) to the top of the center floor panel 18. A structure is thus formed in which, as a result of power being supplied from this battery 32 to a drive motor (not shown in the drawings) that drives at least one of the front wheels or the rear wheels of the vehicle, at least one of the front wheels or the rear wheels are driven so as to cause the hybrid vehicle 10 to travel.

A fuel tank 34 is disposed on the vehicle lower side of the floor panel 14. Hereinafter, the fuel tank 34 will be described.

(Structure of the Fuel Tank 34)

As is shown in FIG. 3, the fuel tank 34 of the present exemplary embodiment is formed substantially in the shape of a hollow rectangular parallelepiped, and is constructed such that fuel can be contained inside it. In addition, a filler pipe (not shown in the drawings) is also provided in the fuel tank 34, and a structure is employed in which fuel can be pumped into the fuel tank 34 by inserting a fuel supply nozzle into a distal end portion of this filler pipe.

Here, the fuel tank 34 is constructed so as to include a tank main body portion 36 and an extension portion 38. The tank main body portion 36 is a portion that is disposed on the vehicle rear side when the fuel tank 34 is mounted in a vehicle, and is disposed in a position on the vehicle lower side of the center floor panel 18 such that at least a portion of the tank main body portion 36 overlaps with the battery 32 when seen in plan view (see FIG. 4). Moreover, a top surface 36A of the tank main body portion 36 is formed as a planar surface without any differences in height other than protruding and recessed portions such as beads and the like (not shown in the drawings).

The extension portion 38, which is continuous with the tank main body portion 36, is formed on a front side of the tank main body portion 36. The extension portion 38 is in communication with the tank main body portion 36, and is disposed on the vehicle lower side of the front floor panel 16 (see FIG. 4). The extension portion 38 is constructed so as to include an in-tunnel extension portion 38A that is disposed in an intermediate portion in the transverse direction of the extension portion 38, and under-panel extension portions 38B that are disposed on both sides in the transverse direction of the in-tunnel extension portion 38A.

The in-tunnel extension portion 38A is formed having substantially the same height as the tank main body portion 36. A top surface of the in-tunnel extension portion 38A is formed on substantially the same plane as the top surface 36A of the tank main body portion 36 at a position that is higher than a general surface 16A of the front floor panel 16. The in-tunnel extension portion 38A is disposed on the inner side of the floor tunnel 20 (see FIG. 4). In contrast, the under-panel extension portions 38B are disposed on the outer sides in the vehicle transverse direction of the floor tunnel 20, and the top surface of the under-panel extension portions 38B is disposed at a position that is lower than the general surface 16A of the front floor panel 16. The under-panel extension portions 38B are each in communication with the in-tunnel extension portion 38A, and the height thereof in the vehicle up-down direction is formed lower than the in-tunnel extension portion 38A. In other words, the height of the in-tunnel extension portion 38A in the vehicle up-down direction is formed higher than that of the under-panel extension portions 38B.

A fuel pump 40 is provided on the inside of the in-tunnel extension portion 38A. The fuel pump 40 is a pump that is used to supply fuel that is stored within the fuel tank 34 to the engine. As is shown in FIG. 1, the fuel pump 40 is provided with a substantially circular column-shaped pump main body 40A whose axial direction is aligned with the vehicle up-down direction, and a filter and the like (not shown in the drawings) that captures foreign matter in the fuel is provided in the pump main body 40A. A substantially circular plate-shaped flange 40B is provided on a top end portion of the pump main body 40A, and this flange 40B is attached to the top surface of the in-tunnel extension portion 38A.

Here, the fuel pump 40 is disposed on the vehicle lower side of the extraction hole 20C that is formed in the floor tunnel 20. Because of this, the extraction hole 20C and the fuel pump 40 overlap each other when seen in plan view (see FIG. 4). By opening the lid component 35 that is attached to the top wall 20A of the floor tunnel 20, it is possible to access the fuel pump 40 from inside the vehicle cabin, and the fuel pump 40 can be extracted via the extraction hole 20C.

(Action and Effects)

The action and effects of the vehicle lower portion structure of the present exemplary embodiment will now be described.

In the vehicle lower portion structure for the hybrid vehicle 10 according to the present exemplary embodiment, the fuel tank 34 is disposed on the vehicle lower side of the floor panel 14. The fuel tank 34 includes the tank main body portion 36, which is disposed on the vehicle lower side of the center floor panel 18 and on the vehicle lower side of the battery 32, and the extension portion 38, which is disposed on the vehicle lower side of the front floor panel 16. In this way, by disposing the extension portion 38, which is in communication with the tank main body portion 36, on the vehicle lower side of the front floor panel 16, a sufficient fuel tank capacity can be secured compared to a structure in which the fuel tank is disposed solely on the vehicle lower side of the center floor panel 18.

In particular, in the hybrid vehicle 10 in which the battery 32 is disposed on the vehicle lower side of the rear seat 26, compared with a conventional vehicle in which no battery 32 is mounted, the size of the fuel tank is reduced by an amount corresponding to the size of the battery 32, so that it becomes difficult to secure an adequate fuel tank capacity. In the present exemplary embodiment, by locating the extension portion 38 on the vehicle lower side of the front floor panel 16, and employing a structure in which this extension portion 38 and the tank main body portion 36 are in communication with each other, it is possible to secure a sufficient fuel tank capacity. Moreover, if the fuel tank is extended towards the vehicle rear side, then this imposes limits on the remaining space that is needed in order to mount the peripheral components such as the motor that is used to drive the rear wheels, however, by extending the fuel tank towards the vehicle front side, as is the case in the present exemplary embodiment, it is possible to secure sufficient space to mount these peripheral components in the vehicle rear portion.

Moreover, as is shown in FIG. 3, the extension portion 38 of the present exemplary embodiment is provided with the under-panel extension portions 38B on both sides in the vehicle transverse direction of the in-tunnel extension portion 38A that is positioned inside the floor tunnel 20. As a result, it is possible to effectively increase the capacity of the fuel tank 34. Moreover, because the top surface of the in-tunnel extension portion 38A is formed higher than the under-panel extension portions 38B, and also higher than the general surface 16A of the front floor panel 16, compared with a structure in which the height of the in-tunnel extension portion 38A is the same as the height of the under-panel extension portions 38B, it is possible to increase the capacity of the fuel tank 34.

Furthermore, in the present exemplary embodiment, the fuel pump 40 is provided inside the in-tunnel extension portion 38A. Here, because the height in the vehicle up-down direction of the general portions of the front floor panel 16 where the floor tunnel 20 is not formed is lower than the height of the center floor panel 18, it is not possible for the fuel pump 40, which has an extended length in the vehicle up-down direction, to be disposed in these general portions. In contrast to this, in the present exemplary embodiment, by providing the fuel pump 40 in the in-tunnel extension portion 38A on the inside of the floor tunnel 20, even if a fuel pump 40 that has an extended length in the vehicle up-down direction is employed, it is still possible to locate this fuel pump 40 on the vehicle lower side of the front floor panel 16 without having to lower the position of the fuel tank 34.

Furthermore, in the present exemplary embodiment, the extraction hole 20C is formed in the top wall 20A of the floor tunnel 20, and it is possible to extract the fuel pump 40 through this extraction hole 20C. As a result, it is possible to extract the fuel pump 40 from inside the vehicle cabin simply by opening the lid component 35 and pulling up the fuel pump 40. Here, a comparative example will be considered in which the fuel pump 40 is disposed on the vehicle lower side of the battery 32. In this comparative example, when the fuel pump 40 is extracted from inside the vehicle cabin, because it is necessary to either lift up the rear seat 26 or else remove this rear seat 26, and then to also remove the battery 32 as well, there is room for improvement from the standpoint of maintenance. In contrast to this, in the present exemplary embodiment, it is not necessary for the battery 32 to be removed, and neither is it necessary for the rear seat 26 to be lifted up or removed. Because of this, the fuel pump 40 can be extracted with ease, and filter replacements and inspections can easily be performed. Namely, the ease with which maintenance can be performed is improved.

Moreover, in the present exemplary embodiment, as is shown in FIG. 4, the extraction hole 20C and the fuel pump 40 overlap each other when seen in plan view. Consequently, an operator is able to visually observe the fuel pump 40 simply by opening the lid component 35, and is able to easily access the fuel pump 40 via the extraction hole 20C. As a result, it is possible to extract the fuel pump 40 efficiently.

A vehicle lower portion structure according to an exemplary embodiment of the present invention has been described and illustrated above, however, it should be understood that the present invention may be implemented in a variety of modes insofar as they do not depart from the spirit or scope of the present invention. For example, in the present exemplary embodiment, the height of the in-tunnel extension portion 38A is formed higher than the height of the under-panel extension portions 38B, however, the present invention is not limited to this. It is also possible for the in-tunnel extension portion 38A to be formed having the same height as the under-panel extension portions 38B. However, from the standpoint of securing tank capacity, it is preferable for the height of the in-tunnel extension portion 38A to be raised to approximately the height of the floor tunnel 20.

Moreover, in the present exemplary embodiment, as is shown in FIG. 3, the fuel tank 34 is formed in the shape of a rectangular parallelepiped, however, the present invention is not limited to this, and it is also possible to form the fuel tank 34 in some other shape. For example, it is also possible for the fuel tank 34 to be formed having a different shape on the vehicle left side from the shape thereof on the vehicle right side in order to avoid interference with any peripheral components that may be disposed on the vehicle lower side of the floor panel 14.

Furthermore, in the present exemplary embodiment, as is shown in FIG. 4, the extraction hole 20C and the fuel pump 40 are formed in positions where they overlap each other when seen in plan view, however, the present invention is not limited to this. For example, it is also possible for the position of the fuel pump 40 and the position where the extraction hole 20C is formed to be offset from each other in the vehicle front-rear direction insofar as this does not affect the task of extracting the fuel pump 40.

Furthermore, in the present exemplary embodiment, the extraction hole 20C is blocked off by the lid component 35 that can be opened and closed, however, the present invention is not limited to this. For example, it is also possible to employ a structure in which at least a portion of the extraction hole 20C is exposed instead of it being completely blocked off.

Moreover, in the present exemplary embodiment, the extraction hole 20C is formed in the top wall 20A of the floor tunnel 20, however, the present invention is not limited to this. For example, it is also possible to employ a structure in which an extraction hole is formed in a side wall 20B of the floor tunnel 20 so that the fuel pump 40 can be accessed via this extraction hole. Moreover, it is also possible to form extraction holes in both the top wall 20A and the side wall 20B of the front tunnel 20.

Furthermore, in the present exemplary embodiment, the under-panel extension portions 38B are provided on both sides in the transverse direction of the in-tunnel extension portion 38A, however, the present invention is not limited to this. For example, it is also possible to employ a structure in which an under-panel extension portion 38 is only provided on one side in the transverse direction of the in-tunnel extension portion 38A. Alternatively, if it is possible to secure sufficient capacity for the fuel tank 34 without providing the under-panel extension portions 38B, then it is also possible to employ a structure in which only the under-tunnel extension portion 38A is provided.

What is claimed is:

1. A vehicle lower portion structure for a hybrid vehicle, the vehicle lower portion structure comprising:
   a front floor panel that is disposed at a vehicle front side of a vehicle lower portion, a floor tunnel that protrudes towards a vehicle upper side and extends in a vehicle front-rear direction being provided in the front floor panel at an intermediate portion in a vehicle transverse direction of the front floor panel;
   a center floor panel that is disposed at a vehicle rear side of the front floor panel so as to sandwich a step portion between the center floor panel and the front floor panel, that is also disposed at a vehicle upper side of the front floor panel, and on which a rear seat is provided;

a vehicle drive battery that is disposed on top of the center floor panel and at a vehicle lower side of the rear seat;

a fuel tank that is formed so as to include a tank main body portion that is disposed at a vehicle lower side of the center floor panel, at least a portion of the tank main body being disposed at a position that overlaps with the vehicle drive battery when seen in plan view, and to include an in-tunnel extension portion that is inside the floor tunnel and communicates with the tank main body portion; and a fuel pump that is provided at a position within the in-tunnel extension portion where the fuel pump is able to be extracted via an extraction hole formed in the floor tunnel, wherein an openable and closable lid is associated with the extraction hole, the lid being in a closed position to close the extraction hole when access to the fuel pump is not needed and in an open position to open the extraction hole to permit extraction of the fuel pump.

2. The vehicle lower portion structure for a hybrid vehicle according to claim 1, wherein an under-panel extension portion that communicates with the in-tunnel extension portion is disposed at one side in the vehicle transverse direction, or on both sides in the vehicle transverse direction, of the in-tunnel extension portion.

3. The vehicle lower portion structure for a hybrid vehicle according to claim 2, wherein a top surface of the in-tunnel extension portion is disposed at a higher position than a general surface of the front floor panel.

4. The vehicle lower portion structure for a hybrid vehicle according to claim 1, wherein:
the extraction hole is formed in a top wall of the floor tunnel; and
the extraction hole overlaps with the fuel pump when seen in plan view.

5. The vehicle lower portion structure for a hybrid vehicle according to claim 1, wherein the fuel pump pumps fuel from the fuel tank to supply the fuel to an engine.

6. The vehicle lower portion structure for a hybrid vehicle according to claim 1, wherein the extraction hole is located in an area of the front floor panel.

7. A vehicle lower portion structure for a hybrid vehicle, the vehicle lower portion structure comprising:

a front floor panel that is disposed at a vehicle front side of a vehicle lower portion, a floor tunnel that protrudes towards a vehicle upper side and extends in a vehicle front-rear direction being provided in the front floor panel at an intermediate portion in a vehicle transverse direction of the front floor panel;

a center floor panel that is disposed at a vehicle rear side of the front floor panel so as to sandwich a step portion between the center floor panel and the front floor panel, that is also disposed at a vehicle upper side of the front floor panel, and on which a rear seat is provided;

a vehicle drive battery that is disposed on top of the center floor panel and at a vehicle lower side of the rear seat;

a fuel tank that is formed so as to include a tank main body portion that is disposed at a vehicle lower side of the center floor panel, at least a portion of the tank main body being disposed at a position that overlaps with the vehicle drive battery when seen in plan view, and to include an in-tunnel extension portion that is inside the floor tunnel and communicates with the tank main body portion; and a fuel pump that is provided at a position within the in-tunnel extension portion where the fuel pump is able to be extracted via an extraction hole formed in the floor tunnel, wherein the extraction hole is formed closer to a vehicle front side than the rear seat, and wherein an openable and closable lid is associated with the extraction hole, the lid being in a closed position to close the extraction hole when access to the fuel pump is not needed and in an open position to open the extraction hole to permit extraction of the fuel pump.

8. The vehicle lower portion structure for a hybrid vehicle according to claim 7, wherein the extraction hole is located in an area of the front floor panel.

* * * * *